Figure 1:
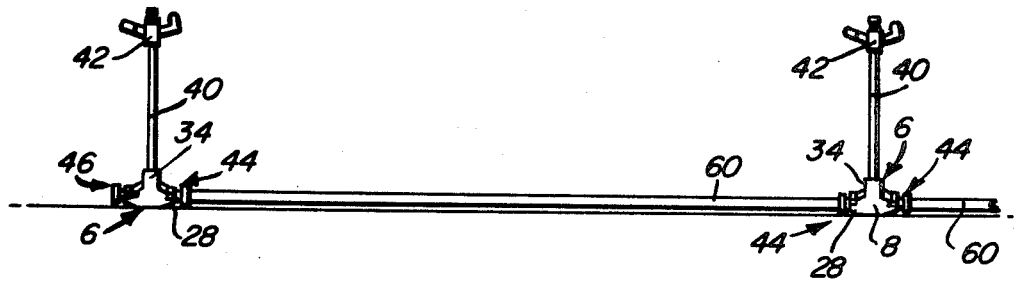

United States Patent [19]
Watts et al.

[11] 3,735,928
[45] May 29, 1973

[54] SPRINKLER MOUNTING AND PIPE CONNECTOR

[76] Inventors: Thomas E. Watts, P.O. Box 534; Clifford L. Ballard, P.O. Box 48, both of Shelley, Idaho 83274

[22] Filed: Dec. 2, 1971

[21] Appl. No.: 203,965

[52] U.S. Cl. .................239/267, 239/213, 285/5, 285/305, 285/404, 285/DIG. 2, 138/89
[51] Int. Cl. ..........................A01g 25/00, F16l 41/00
[58] Field of Search.....................285/5, 6, 305, 404; 239/213, 212, 267; 137/344

[56] References Cited

UNITED STATES PATENTS

| 3,545,478 | 12/1970 | Etgen | 285/5 X |
|---|---|---|---|
| 3,664,688 | 5/1972 | De Loach | 285/6 |
| 3,376,052 | 4/1968 | Zimmerer et al. | 285/305 X |
| 2,916,305 | 12/1959 | Sherman | 285/5 |
| 3,558,160 | 1/1971 | Falkner | 285/404 X |
| 1,298,878 | 4/1919 | Brown | 285/305 X |

FOREIGN PATENTS OR APPLICATIONS

| 1,397,378 | 3/1965 | France | 285/305 |
|---|---|---|---|
| 1,030,535 | 5/1966 | Great Britain | 285/305 |

Primary Examiner—Thomas F. Callaghan
Attorney—Harvey B. Jacobson

[57] ABSTRACT

A T-coupling for anchoring and supporting a vertical upstanding spray pipe having its upper end provided with an appropriate sprinkler head. The T-coupling comprises an elongated hollow body having a pair of horizontally aligned branches and a complemental upstanding vertical branch. The vertical branch supports the spray pipe. The respective horizontal branches are basically alike in that the outer end of each branch has diametrically opposite notches. These notches open outwardly and provide keyways. They also define upper and lower half portions which in turn are provided with paired keeper holes for L-shaped keeper pins. The notched horizontal branches serve to accommodate attachable and detachable fittings. One fitting comprises a sleeve and has diametrically opposite positioning and retaining lugs which are removably lodged in the keyways and held in place by the keeper pins. One fitting serves as a connector for the coacting end portion of a pipeline which delivers and feeds water to the coupling. The other fitting is provided with a flanged closing head and constitutes a closing plug for that end of the coupling with which it is cooperable.

4 Claims, 3 Drawing Figures

Patented May 29, 1973 3,735,928

SPRINKLER MOUNTING AND PIPE CONNECTOR

The present invention relates to certain new and useful improvements in a sprinkler-type field or area spraying device, that is, a device which is incorporated in a pipeline or conduit which functions to deliver water from a suitable source and supplies it to the cooperable sprinkler heads.

More particularly, the concept has to do with a structurally and functionally novel T-coupling whose respective horizontally aligned branches are provided with outwardly opening diametrically opposite notches, said notches providing keyways and said keyways serving to accommodatingly seat and retain coacting keying lugs on fittings which are telescopically fitted into the bores of the respective notched branches.

In carrying out the principles of the invention, the respective terminal ends of the bottom half portions of the coupling are chamfered and beveled upwardly and outwardly whereby the coupling serves not only as a connector but as a skid for shifting and moving the pipeline from place to place and for distributively and effectually sprinkling the surface of the adjacent area.

As is known by persons conversant with the state of the art to which the invention relates, mobile and skid-type spraying and sprinkling devices are not, broadly stated, new. For background purposes, the reader, if so desired, may be interested in referring to U.S. Pat. No. 2,678,844 of May 18, 1954, or, if preferred, to U.S. Pat. 2,947,483 of August 2, 1960.

Briefly, one aspect of the instant invention pertains to a T-coupling characterized by an elongated hollow body portion having horizontal axially aligned companion branches and, in addition, a complemental vertically disposed upstanding branch which is internally screw-threaded. The last-named branch serves to accommodate the lower screw-threaded anchoring end of a spray pipe, that is, a pipe whose lower end is anchored on the coupling and whose upper end is provided with an appropriate flow actuated sprinkler head. Each horizontal branch has diametrically opposite notches which are open at their outer ends and which constitute keyways. In addition, these notched branches define upper and lower half portions which in turn provide an appropriate bore. Each notched horizontal branch serves to accommodate a telescoping portion of an attachable and detachable fitting. One fitting comprises an open-ended sleeve with an abutment flange intermediate its ends, one half portion of the sleeve telescoping into the associated bore and the other half portion projecting and serving to permit an end portion of a pipeline to be connected thereto. The telescoping portion is provided with diametrically opposite outstanding lugs which constitute keys which are removably lodged in the respective keyways. The other fitting also has a telescoping portion which is telescopically fitted into the bore of the associated branch and it too is provided with diametrically opposite outstanding lugs which constitute keys fitted into the associated keyways. The last-named fitting has an imperforate head on its outer end and constitutes a closing plug. These fittings also constitute adapters and are interchangeable and are used according to the requirements at hand and the lugs on the respective fittings are held against displacement by L-shaped pins which serve as keepers and which are fitted into keeper holes provided therefore.

The T-shaped coupling functions not only as assembling and coupling means for the associated fittings or adapters, the terminal end portions of the bottom halves of the respective horizontal branches are beveled or tapered to provide skids. Accordingly, the coupling also functions as a mobile skid unit.

Figure 2:
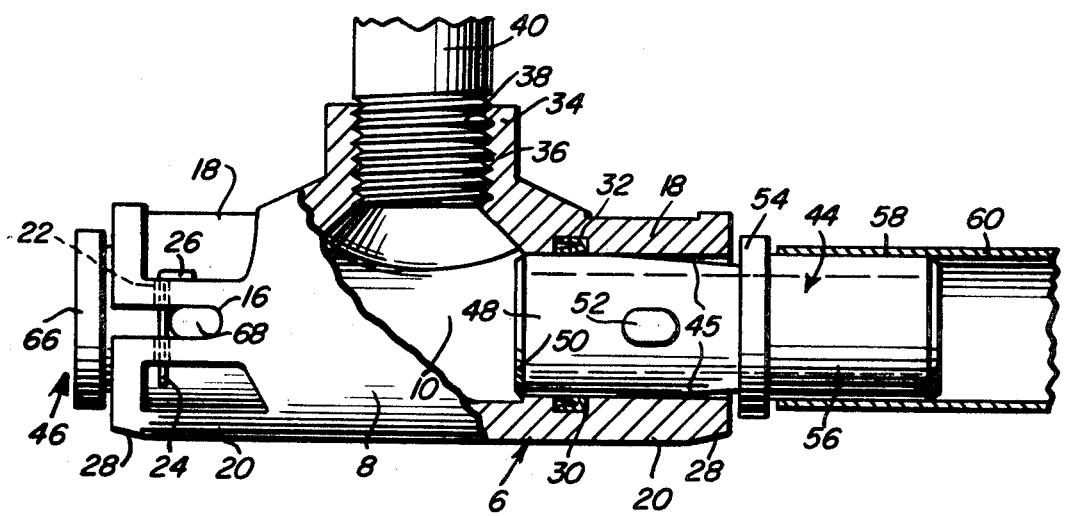
Figure 3:
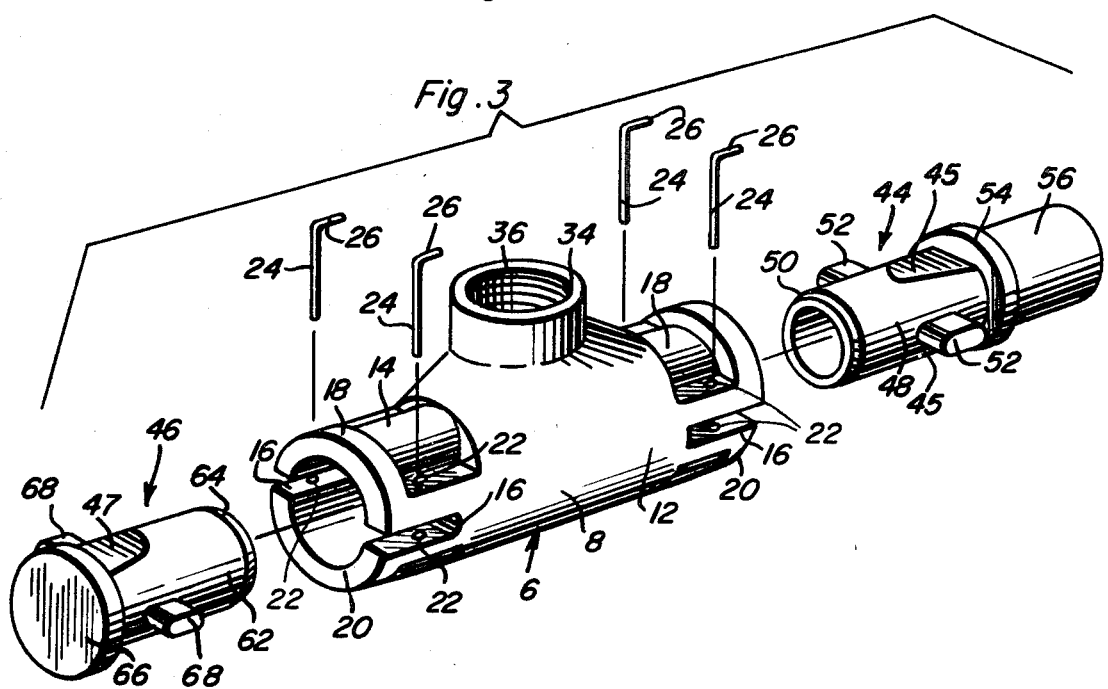

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view on a small scale showing a field or area sprinkler system, that is, two upstanding sprinklers carried by and associated with a water supply conduit or pipeline;

FIG. 2 is a suitably enlarged view detailing the essence of the invention, that is the improved sprinkler mounting and pipe connector, more particularly the T-shaped coupling with parts in section and elevation and showing one adapter fitting at the right, and other adapter fitting at the left; and FIG. 3 is an exploded view in perspective showing the novel T-coupling or connector, the L-shaped keeper pins, the sleeve-type adapter fitting at the right and the plug-in type adapter fitting at the left, the latter fitting serving as a closure when it is in place as evident in FIG. 2.

By way of introduction, the inventive concept pertains, broadly construed, to a mobile skid-type spray apparatus or system, as suggested in FIG. 1. Primarily, however, the concept has to do with the sprinkler mounting and pipe coupling or connector means which is shown with greater particularity in FIGS. 2 and 3.

To the ends desired the T-coupling, is denoted by the numeral 6. The hollow body portion is denoted at 8 and the hollow chamber itself is denoted at 10 (FIG. 2). Both the left and right hand end portions of the unit are the same in construction but can be used for the purpose of coupling adjacent pipe ends or for the purpose of coupling one pipe end at the right in FIG. 2 and a closing fitting at the left. In either event, these horizontal branches are basically the same in construction, the branch at the right in FIG. 3 being denoted at 12 and the branch at the left denoted at 14. Each branch is such as to define a split cylindrical bore. More particularly, each branch is provided at diametrically opposite points with outwardly opening notches which are properly paired and constitute keyways and are designated at 16. By providing these bifurcations or notches, the branch is divided into upper and lower substantially semi-cylindrical half portions, one at 18 and the other one at 20. These notched half portions are in turn provided with aligned properly paired holes which are designated as keeper holes as at 22. These holes serve to accommodate the long leg portions 24 of the attachable and detachable keeper pins. The horizontal short leg provides a finger grip as at 26. In this connection and because both branches 12 and 14 are structurally the same, like reference characters are being employed to designate like parts. This manner of description seems advisable inasmuch as the notched branches are interchangeable. In addition, the underneath half portion of each branch, that is the bottom thereof, is chamfered or beveled as at 28 to provide the desired skid function. It follows that the coupling is also referred to as a skid unit. It will be further noted in particular in FIG. 2 that the internal bore is provided with groove means 30 which accommodates self-acting or expanding packing or gasket means 32. With reference now to the third branch, this constitutes a vertical branch and is denoted by the numeral 34 and is properly centralized and internally screw-threaded as at 36 to accommodate a screw-threaded lower end portion 38 of a vertical or upstanding pipe 40 whose upper end is provided with an appropriate spinner type sprinkler head 42 (not detailed). Thus, this unique coupling provides a mounting for the sprinkler pipe and, in addition, as coupling means for the pipe sections of the over-all water delivering and supplying conduit.

It will be evident that the notched horizontal branches 12 or 14 serve to accommodate the specially constructed attachable and detachable fittings. One fitting, the one at the right in FIG. 3, is denoted by the numeral 44 and the other one at the left is denoted by the numeral 46. In addition, these fittings serve as adapters and are basically alike but perform different functions. In some instances, two of the fittings 44 are used as suggested in FIG. 1 when a circulating conduit or pipeline is desired for distributive purposes. In other instances where it is desired to close the conduit, the plug-type fitting 46 is used. With reference again to the sleeve-type fitting 44, this comprises an open-ended sleeve having an inner end portion 48 which is telescopingly fitted into the bore provided therefor. The terminal inner end is beveled as at 50. The median portion is provided with a pair of diametrically opposite outstanding lugs or detents 52 which are lined up with and fitted and seated in the respective keying notches 16. Accordingly, the lugs can also be referred to as assembling and retaining keys. The intermediate portion of the sleeve is provided with an encircling outstanding flange 54 which constitutes a limit stop or abutment. The half portion 56 serves to telescope into and hold in place an end portion 58 of the pipeline 60.

With respect now to the plug-type fitting, this too comprises what may be referred to as a sleeve 62 and it has a beveled piloting end 64. The outer end of the sleeve is closed by an imperforate enlarged head 66. The median portion of the sleeve is provided with diametrically opposite outstanding keying lugs 68 which obviously fit into the notches or keyways provided therefor and are held in place by the L-shaped keeper pins already described and in the manner shown with particularity at the left in FIG. 2.

It is within the purview of the concept to taper and also flatten the diametrically opposite top and bottom surfaces of the fittings 44 and 46, as at 45 and 47. These adaptations are fully shown in FIG. 3 prior to inserting the fittings. On the other hand, the purpose and manner of use of the fitting 44 is clearly illustrated in FIG. 2, from which it will be self-evident that the trapped water will bleed off and drain out of the coupling when the water pressure has been shut off (not shown).

It is reiterated that the T-coupling 6 provides not only a connector for the associated component parts but in addition, and primarily so, as a skid unit for shifting the sprinkler means from place to place in the field or area which is to be sprayed.

It is submitted that the invention herein disclosed, described and claimed well serves the purposes for which it has been devised. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. An area spraying sprinkler device comprising a T-coupling embodying an elongated hollow body having horizontal axially aligned branches and a complemental vertically disposed upstanding screw-threaded branch, a vertical spray pipe having a lower screw-threaded end screwed into and communicating with said upstanding branch and having an upper end provided with a sprinkler head, each horizontal branch having horizontal diametrically opposite notches which are open at their outer ends and which provide companion keyways, said notched branches embodying upper and lower semi-circular half-portions, a first adapter fitting comprising a sleeve provided on a median peripheral surface with an outstanding rib, said rib being of an outside diameter less than the outside diameter of said horizontal branches and constituting a limit stop for said adapter fitting, said fitting having an insertable inner end portion which is capable of being fitted telescopically into a selected one of the aforementioned horizontally elongated branches, said inner portion being provided at diametrically opposite points with outstanding horizontal lugs, said lugs constituting keys and said keys being removably keyed in their respectively cooperable keyways, said half portions being provided with aligned keeper holes, and vertically disposed manually insertable and removable L-shaped keeper pins, said keeper pins having long leg portions removably fitted into their respectively cooperable keeper holes and cooperatively engaging the respectively adjacent lugs in a manner to retain the lugs in a given keyed position.

2. The area spraying and sprinkler device defined in and according to claim 1 and, in combination, a second adapter fitting comprising a sleeve which is capable of being telescopingly fitted into the bore of a selected one of said branches, said sleeve being provided at diametrically opposite points with horizontal outstanding lugs, constituting keys, said keys being removably lodged and retained in the respectively cooperable keyways, said sleeve being provided at an outer end with an enlarged imperforate head whereby to thus provide a closing plug for the associated branch, said head being of a diameter smaller than the outside diameter of the coordinating branch.

3. The area spraying and sprinkler device defined in and according to claim 2, and wherein diametrically opposite top and bottom peripheral surface portions of said adapter sleeves are provided with relieved and flattened surface portions which, when in use, function to bleed off and drain trapped water from the hollow body portion of the coupling when the supply of water is turned off.

4. The area spraying and sprinkler device defined in and according to claim 3, and wherein the underneath half-portion of each branch is bevelled upwardly and outwardly in a manner to provide selectively usable skids, the latter permitting skidding of the overall assembly either forwardly or rearwardly, at will.

* * * * *